(12) United States Patent
Mohiuddin et al.

(10) Patent No.: US 12,380,485 B2
(45) Date of Patent: Aug. 5, 2025

(54) SYSTEMS AND METHODS FOR ALTERING A GRAPHICAL USER INTERFACE BASED ON A CUSTOMER JOURNEY GRAPH

(71) Applicant: Walmart Apollo, LLC, Bentonville, AR (US)

(72) Inventors: Mohammad Aziz Mohiuddin, Bayonne, NJ (US); Ravi Kumar Yadav, Fair Lawn, NJ (US); Yan Chen, Montville, NJ (US); Donggu Kim, Jersey City, NJ (US); Pankaj Adsul, Wood Ridge, NJ (US); Vishal Kumar Rathi, Kearny, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 383 days.

(21) Appl. No.: 17/588,316

(22) Filed: Jan. 30, 2022

(65) Prior Publication Data
US 2023/0245199 A1 Aug. 3, 2023

(51) Int. Cl.
*G06F 16/00* (2019.01)
*G06F 16/242* (2019.01)
*G06Q 30/0201* (2023.01)
*G06Q 30/0601* (2023.01)

(52) U.S. Cl.
CPC ..... *G06Q 30/0631* (2013.01); *G06F 16/2425* (2019.01); *G06Q 30/0201* (2013.01); *G06Q 30/0625* (2013.01)

(58) Field of Classification Search
CPC ........... G06Q 30/0631; G06Q 30/0201; G06Q 30/0625; G06F 16/2425; G06F 16/24578; G06F 16/3322; G06F 16/90324; G06F 16/9535
See application file for complete search history.

(56) References Cited

U.S. PATENT DOCUMENTS

| | | | |
|---|---|---|---|
| 11,809,447 B1 * | 11/2023 | Dillman | G06F 16/26 |
| 11,921,715 B2 * | 3/2024 | Luo | G06F 16/245 |
| 2015/0178397 A1 * | 6/2015 | Garg | H04L 67/02 707/722 |
| 2015/0205828 A1 | 7/2015 | Manciero et al. | |
| 2015/0324361 A1 | 11/2015 | Glass et al. | |
| 2016/0078101 A1 | 3/2016 | Somaiya et al. | |
| 2017/0098012 A1 * | 4/2017 | Zhu | G06F 16/24578 |
| 2017/0109411 A1 | 4/2017 | Daya et al. | |
| 2021/0034633 A1 | 5/2021 | Bartels et al. | |

* cited by examiner

*Primary Examiner* — Paul Kim
(74) *Attorney, Agent, or Firm* — DICKINSON WRIGHT RLLP; Hector A. Agdeppa (57) ABSTRACT

A system including one or more processors and one or more non-transitory computer readable media storing computing instructions that, when executed on the one or more processors, perform: receiving historical in-session user activity information; building a customer journey graph based on the historical in-session user activity information; generating suggested queries based on the customer journey graph; and in response to identifying an input query for a user session of a user: re-ranking the suggested queries; and displaying the suggested queries, as re-ranked, to the user via a graphical user interface (GUI). Other embodiments are described.

20 Claims, 5 Drawing Sheets

400

410 – Receiving historical in-session user activity

420 – Building a customer journey graph based on the historical in-session user activity information 430 – Generating suggested queries based on the customer journey graph 440 – Identifying an input query for a user session of a user 450 – Re-ranking the suggested queries 460 – Displaying the suggested queries, as re-ranked, to the user via a GUI

SYSTEMS AND METHODS FOR ALTERING A GRAPHICAL USER INTERFACE BASED ON A CUSTOMER JOURNEY GRAPH

TECHNICAL FIELD

This disclosure relates generally to user query analysis, and more particularly to systems and methods for altering a graphical user interface based on a customer journey graph.

BACKGROUND

Search engines are an integral part of most computing systems. Typically, a user inputs a query into a search engine and receives a number of results. However, these results may not be what the user was looking for. This results in the user inputting additional queries that can burden the computing system and frustrate the user. In some embodiments, a query suggestion system can be employed to provide suggested queries to the user. However, the results of the query suggestion system may further frustrate the user and/or reduce an efficiency of the computing system.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving historical in-session user activity information; building a customer journey graph based on the historical in-session user activity information; generating suggested queries based on the customer journey graph; and in response to identifying an input query for a user session of a user: re-ranking the suggested queries; and displaying the suggested queries, as re-ranked, to the user via a graphical user interface (GUI).

Various embodiments include a method. The method can be implemented via execution of computing instructions configured to run at one or more processors and configured to be stored at non-transitory computer-readable media. The method can comprise receiving historical in-session user activity information; building a customer journey graph based on the historical in-session user activity information; generating suggested queries based on the customer journey graph; and in response to identifying an input query for a user session of a user: re-ranking the suggested queries; and displaying the suggested queries, as re-ranked, to the user via a graphical user interface (GUI).

Figure 1:
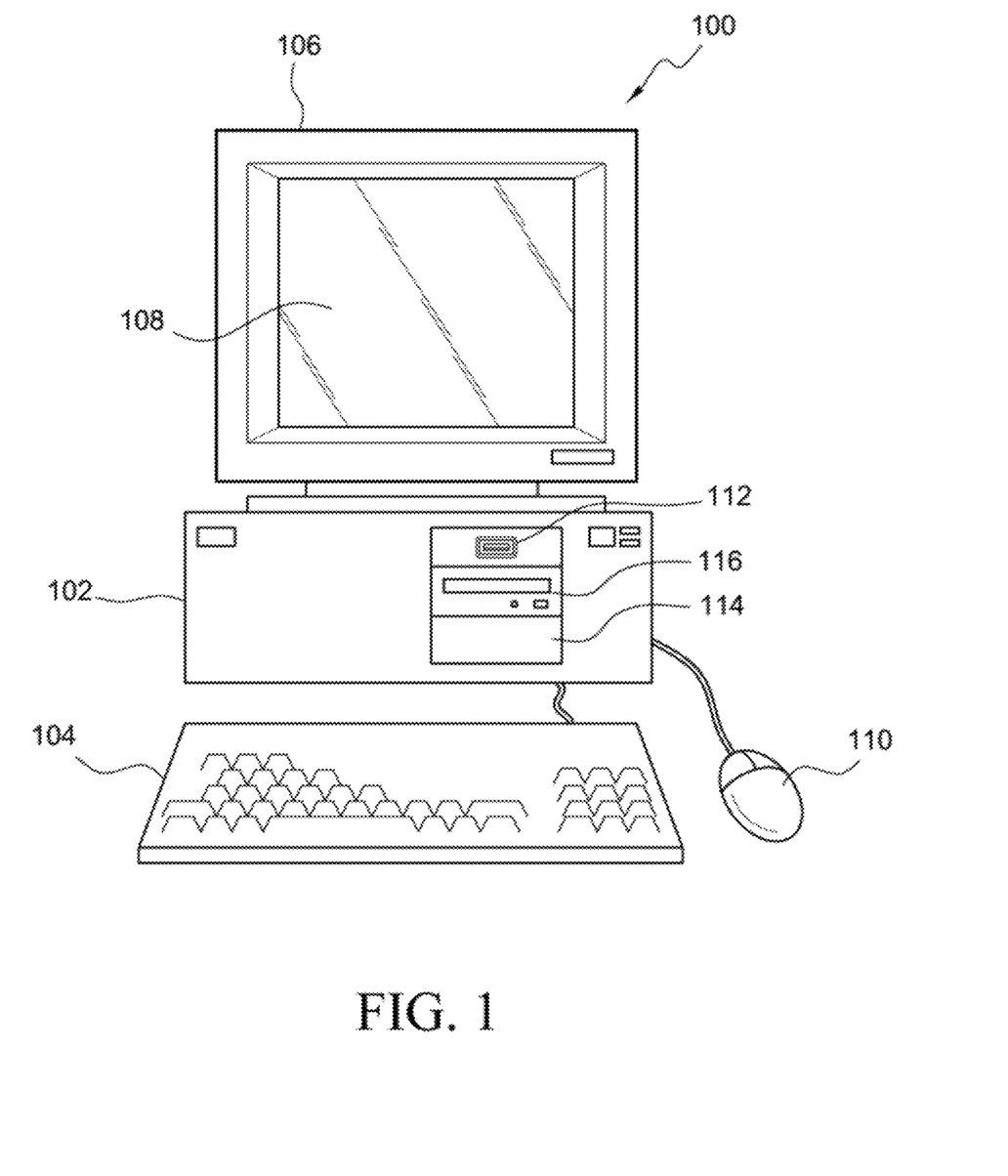
FIG. 1 illustrates a front elevational view of a computer system that is suitable for implementing various embodiments of the systems disclosed in FIG. 3.
Figure 2:
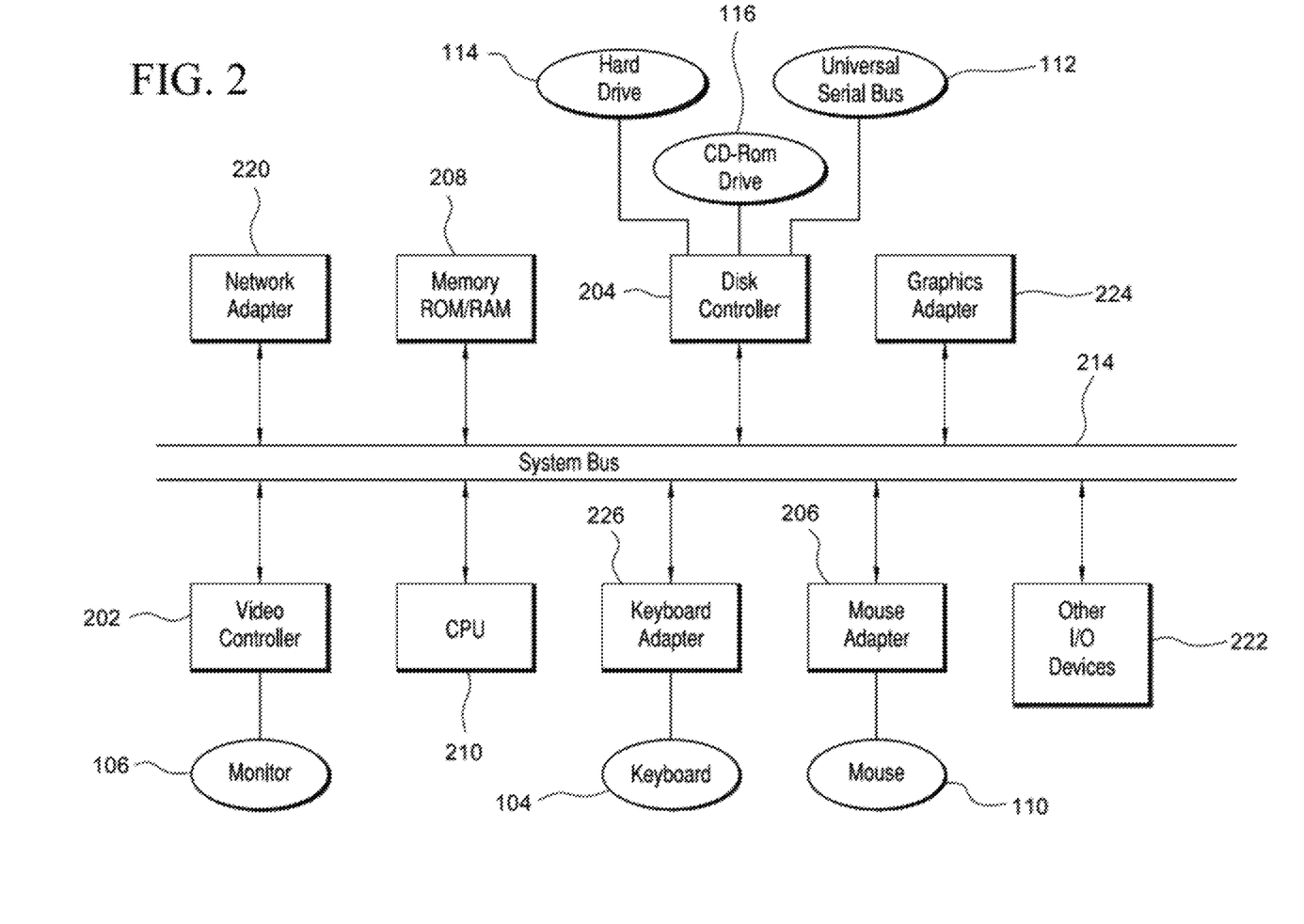
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
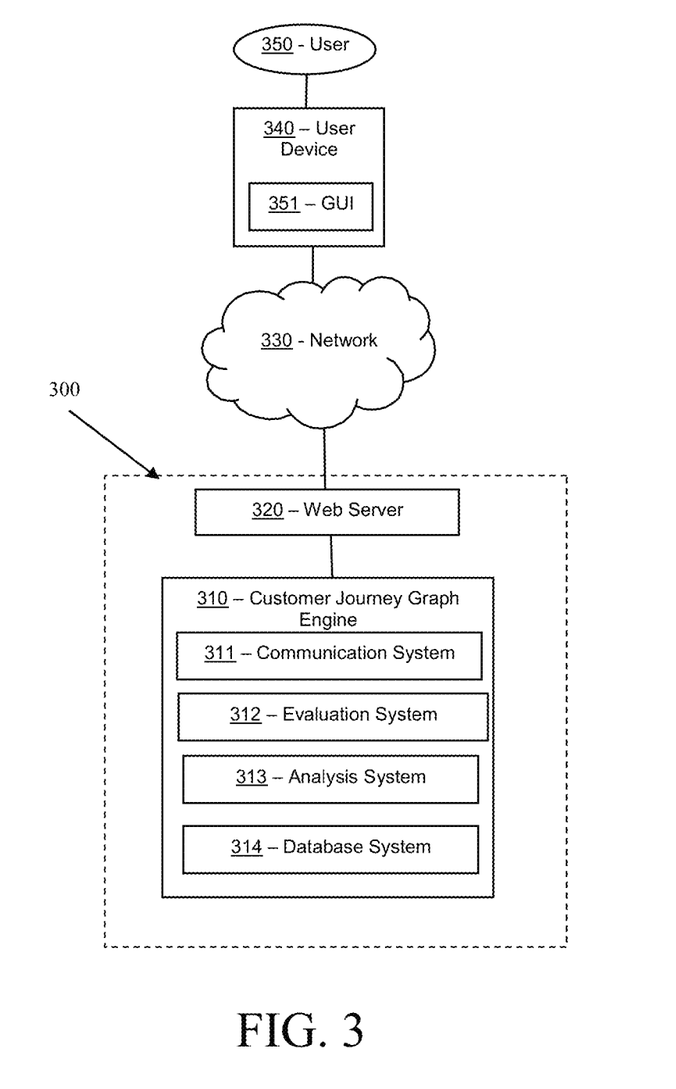
FIG. 3 illustrates a representative block diagram of a system that can be employed for determining and analyzing query suggestions and one or more query suggestion systems, according to an embodiment.

Turning ahead in the drawings, FIG. 3 illustrates a block diagram of a system 300 that can be employed for determining and analyzing query suggestions and one or more query suggestion systems, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a customer journey graph engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Customer journey graph engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host customer journey graph engine 310 and/or web server 320. Additional details regarding customer journey graph engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with a graphical user interface to search for products of interest, in addition to other suitable activities. In a number of embodiments, web server 320 can interface with customer journey graph engine 310 when a user (e.g., 350) is inputting a search query.

In some embodiments, an internal network that is not open to the public can be used for communications between customer journey graph engine 310 and web server 320 within system 300. Accordingly, in some embodiments, customer journey graph engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, customer journey graph engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to customer journey graph engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of customer journey graph engine 310 and/or web server 320. In a similar manner, the processors and/or the non-transitory computer-readable media can be local and/or remote to each other.

Meanwhile, in many embodiments, customer journey graph engine 310 and/or web server 320 also can be configured to communicate with one or more databases, such as a database system 314. The one or more databases can include query suggestion information, user activity information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, customer journey graph engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, customer journey graph engine 310 can include a communication system 311, an evaluation system 312, an analysis system 313, and/or database system 314. In many embodiments, the systems of customer journey graph engine 310 can be modules of computing instructions (e.g., software modules) stored at non-transitory computer readable media that operate on one or more processors. In other embodiments, the systems of customer journey graph engine 310 can be implemented in hardware. Customer journey graph engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host customer journey graph engine 310 and/or web server 320. Additional details regarding customer journey graph engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

Figure 4:
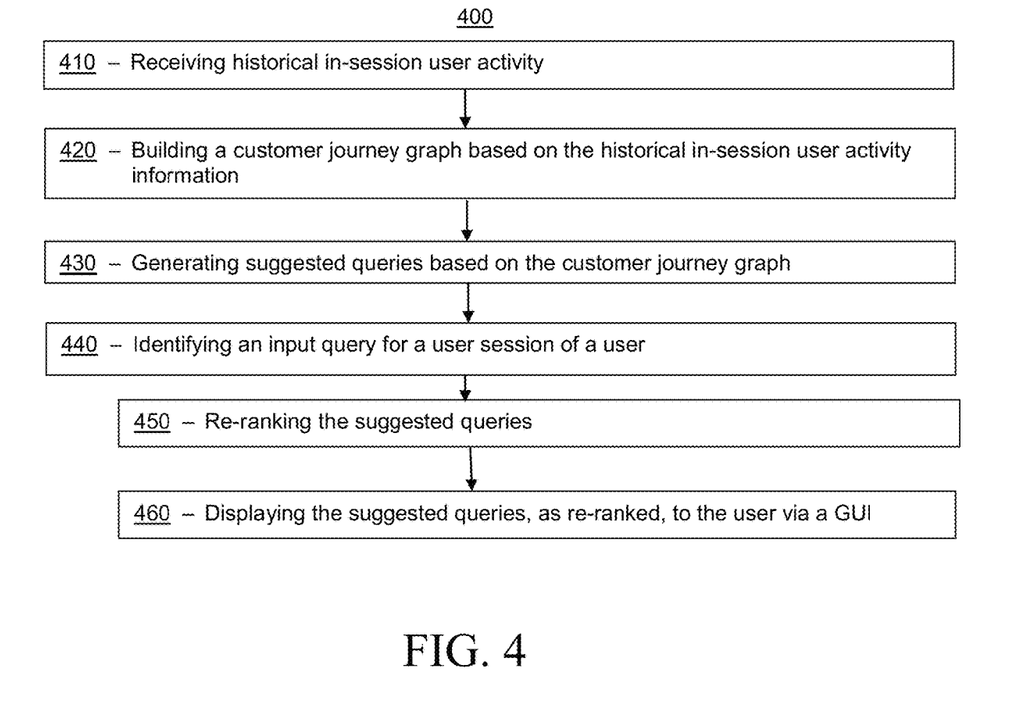
FIG. 4 illustrates a flowchart for a method of determining and analyzing query suggestions, according to certain embodiments.

Turning ahead in the drawings, FIG. 4 illustrates a flow chart for a method 400 of determining and analyzing query suggestions, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as customer journey graph engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving historical in-session user activity information. In some embodiments, the historical in-session user activity information comprises: original queries input by one or more users; subsequent queries input by the one or more users; and/or interaction information corresponding to the original queries and the subsequent queries. In some embodiments, the subsequent queries are input after the original query. For example, a user (e.g., 350 (FIG. 3)) may input an original query of "tv" and in a subsequent query input "Samsung tv." In some embodiments, the interaction information comprises: clicks (e.g., a user clicks on a product displayed in response to a query); adds-to-cart (ATCs) (e.g., a user adds a product displayed in response to a query to their cart); and/or purchases (e.g., a user purchases a product displayed in response to a query). For example, a user may input a query for "tv," view of products displayed on the GUI in response to that query, and click on one of the products.

Figure 5:
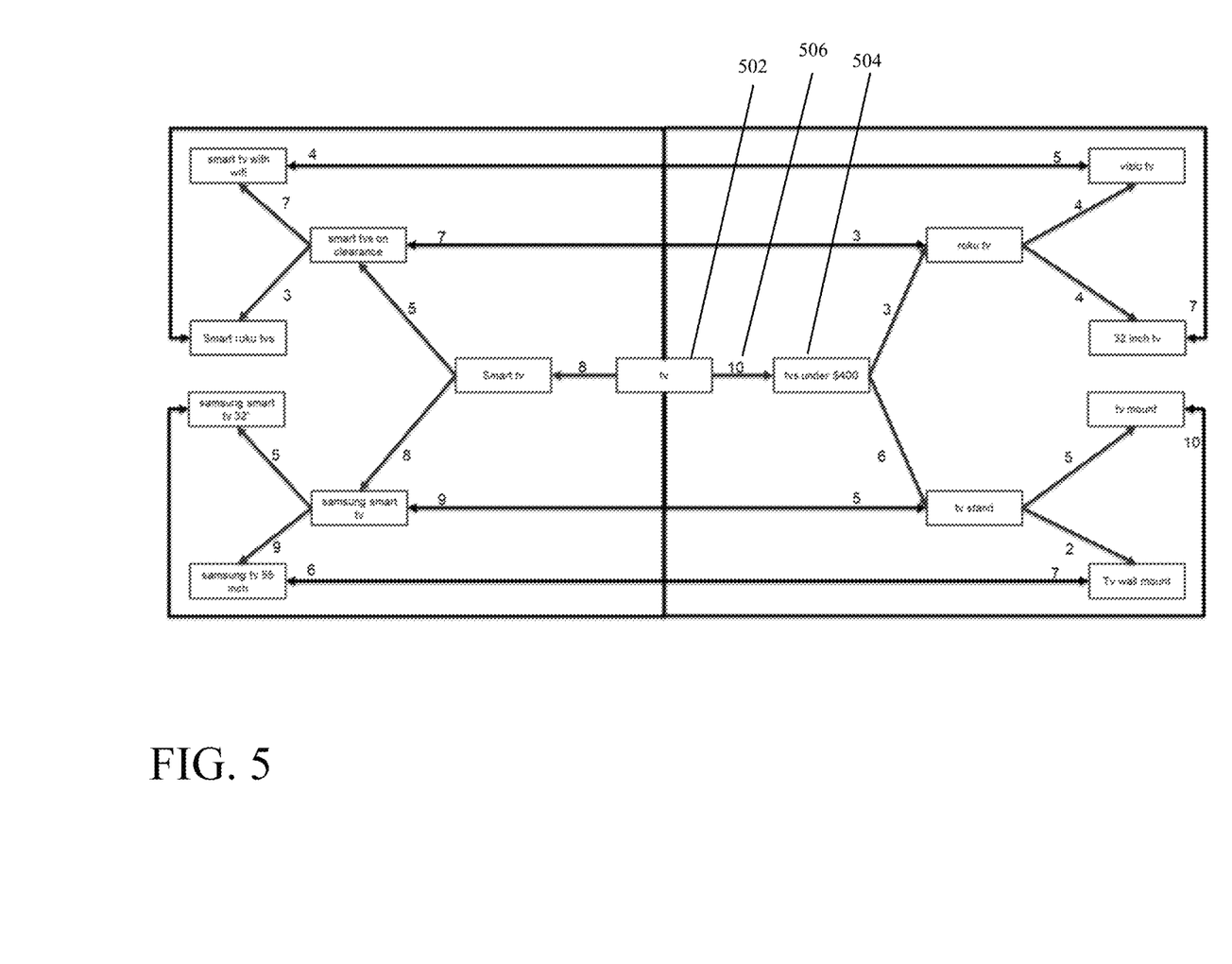
FIG. 5 illustrates an exemplary customer journey graph, according to certain embodiments.

In many embodiments, method 400 can comprise an activity 420 of building a customer journey graph based on the historical in-session user activity information. The customer journey graph can be similar or identical to customer journey graph 500 (FIG. 5, described below). In some embodiments, building the customer journey graph based on the historical in-session user activity information comprises linking together the original queries and the subsequent queries based on the interaction information. For example, a user may search for "tv" as their original query and subsequently search for "Samsung tv," "big screen tv," and "smart tv." The method links together the subsequent queries with the original "tv" query based on the interaction information (e.g., clicks, ATCs, purchases, etc.). In some embodiments, building the customer journey graph comprises generating a respective composite score for each of the subsequent queries using an equation comprising:

$$\text{Composite Score} = (1*\text{clicks} + 2*\text{atc} + 4*\text{conversion})/(1+\text{days\_vintage}),$$

where days_vintage is a time period for the historical in-session user activity information, and conversion represents purchasing the product in the cart. In some embodiments, the time period for days_vintage can comprise at least one of the following: last 30 days, 30 days of future from last year, last 30 days from previous year, last 90 days, last 365 days, or another suitable time period. As such, the days_vintage normalizes the composite score to account for trends. For example, the days_vintage of 30 days future from last year can account for seasonal trends coming up such as Christmas, Halloween, etc. In such an embodiment, the composite scores may increase for certain queries. For example, "Christmas tree" may receive a higher composite score for the days_vintage of 30 days future from last year than "tree" during Christmas time, while "tree" may receive a higher composite score than "Christmas tree" for the days_vintage of last 90 days, depending on the current month.

Turning briefly to FIG. 5, an exemplary customer journey graph 500 is illustrated. In the illustrated embodiment of FIG. 5, the customer journey graph 500 includes an original query 502, a first subsequent query 504, and a first composite score 506. In the illustrated embodiments, the original query 502 corresponds to "tv." That is, one or more users input an original query of "tv" for a user session. In the illustrated embodiment, the first subsequent query 504 corresponds to "tvs under $400." That is, one or more user input a subsequent query of "tvs under $400" after an original query of "tv." In the illustrated customer journey graph 500, the original query 502 and the first subsequent query 504 have a first composite score 506 of "10." That is, based on the interaction information, the activity 420 determined a composite score of 10 for the original query 502 of "tv" with a first subsequent query 504 of "tvs under $400." In the illustrated embodiment of FIG. 5, the customer journey graph 500 comprises multiple links leading from the original query 502 to multiple subsequent queries and their corresponding composite scores. In some embodiments, the customer journey graph 500 is built using subsequent queries that include a token for the original query. For example, the customer journey graph 500 can be built with an original query of "tv" an subsequent queries of "Samsung tv," or "television 4k" because of the token for television. In some embodiments, a subsequent query for "milk" will not be added to the customer journey graph 500 because it does not share a token with the original "tv" query.

Returning to FIG. 4, in many embodiments, method 400 can comprise an activity 430 of generating suggested queries based on the customer journey graph. In some embodiments, generating suggested queries based on the customer journey graph comprises ranking the subsequent queries linked to an original query of the original queries based on the respective composite score for each of the subsequent queries to generate ranked subsequent queries. In some embodiments, the method comprises ranking the subsequent queries based on their respective composite scores from highest to lowest. In some embodiments, generating the suggested queries comprises modifying the ranked subsequent queries by performing spell correction on the ranked subsequent queries. For example, the method corrects any spelling errors that exist in user queries (e.g., change "jeeans" to "jeans"). In some embodiments, generating the suggested queries comprises modifying the ranked subsequent queries by performing stemming on the ranked subsequent queries. For example, the method identifies stem words to represent the query. For example, a user search query for "evaporated milk" can be stemmed to "evaporated" where "evaporated" now represents "evaporated milk." In some embodiments, generating the suggested queries comprises modifying the ranked subsequent queries by performing tokenization on the ranked subsequent queries. For example, the method tokenizes the queries. For example, a query for "jeans for men" can be tokenized into its individuals words (e.g., "jeans" "for" "men") so that any order of those words can be recognized. In some embodiments, generating the suggested queries comprises modifying the ranked subsequent queries by generating the suggested queries based on the tokenization on the ranked subsequent queries. For example, based on the previous steps, the method generates a suggested query (e.g., a button on a GUI referred to as a pill) for "mens" which represents a query for "jeans." In some embodiments, when a new user inputs a query for "jeans," a suggested query will be displayed for "mens" which corresponds to the query for "jeans for men." In some embodiments, generating the suggested queries comprises modifying the ranked subsequent queries by normalizing the suggested queries based on identifying a brand or a price of the suggested queries to generate normalized suggested queries. For example, the method identifies brand or price and normalizes the suggested queries. For example, a suggested query that is generated for "*levis*" can be normalized to "Levi's" based on identifying it as a brand.

In many embodiments, method 400 can comprise an activity 440 of identifying an input query for a user session of a user. In some embodiments, identifying the input query for the user session comprises identifying an original query of the original queries in the customer journey graph that corresponds to the input query for the user session, and identifying the normalized suggested queries for the original query.

In many embodiments, method 400 can comprise an activity 450 of re-ranking the suggested queries. In various embodiments, activity 450 can be performed at the same time or as a part of activity 440. In some embodiments, re-ranking the suggested queries further comprises filtering the normalized suggested queries based on the historical in-session user activity information for the user.

In some embodiments, re-ranking the suggested queries further comprises generating an adjusted score for the subsequent queries using an equation comprising:

$$\text{Adjusted Score} = \text{engagement}*W1 + \text{Brand Affinity}*W2 + (\text{Query Facet}*W3/\text{PT Facet}*W4),$$

where engagement is a portion of the respective composite score, brand affinity is a product type score for the user, and query facet is a number of filters applied by the user. In some embodiments, W1-W4 are weights that are determined based on training data. In some embodiments, the engagement score is determined using an equation comprising: $1*\text{click} + 2*\text{ATC} + 4*\text{conversion}$. In some embodiments, the product score corresponds to a product type affinity for the user. For example, the user may have 9 out of 10 purchases in a "Levi's" product type. In such an embodiment, the user has a brand affinity for "Levi's" and can receive an appropriate score. In some embodiments, the query facet score corresponds to the number of filters a user applies while searching. For example, a user may typically filter results by "men's." In some embodiments, the PT facet is a product type score comprising an aggregation of user queries dominant product type. For example, a user may have 200 out of 300 queries in a "food" product type. Accordingly, the user has a "food" product type score.

In many embodiments, method 400 can comprise an activity 460 of displaying the suggested queries, as re-ranked, to the user via a graphical user interface (GUI). In various embodiments, activity 460 can be performed at the same time or as a part of activity 440. In some embodiments, displaying the suggested queries, as re-ranked, to the user via the GUI comprises displaying eight of the suggested queries having an adjusted score above a threshold. In some embodiments, the method displays the eight of the suggested queries with the highest adjusted scores.

Returning to FIG. 3, in several embodiments, communication system 311 can at least partially perform activity 410 (FIG. 4).

In several embodiments, evaluation system 312 can at least partially perform activity 420 (FIG. 4) and/or activity 430 (FIG. 4).

In a number of embodiments, analysis system 313 can at least partially perform activity 440 (FIG. 4), activity 450 (FIG. 4), and/or activity 460 (FIG. 4).

In a number of embodiments, web server 320 can at least partially perform method 400 (FIG. 4).

In many embodiments, the techniques described herein can provide a practical application and several technological improvements. In some embodiments, the techniques described herein can provide for altering of a graphical user interface to display suggested queries based on building and analyzing a customer journey graph. Such a customer journey graph reduces computations required by other query suggestion systems.

In many embodiments, the techniques described herein can be used continuously at a scale that cannot be reasonably performed using manual techniques or the human mind. For example, processing millions of queries within milliseconds cannot be feasibly completed by a human.

In a number of embodiments, the techniques described herein can solve a technical problem that arises only within the realm of computer networks, as queries do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the customer journey graph cannot be operated without a computer system and/or network.

Although systems and methods for building and analyzing a customer journey graph have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, perform:
  receiving historical in-session user activity information, wherein the historical in-session user activity information comprises:
    original queries input by one or more users; and
    subsequent queries input by the one or more users;
  building a customer journey graph based on the historical in-session user activity information, comprising:
    linking together the original queries and the subsequent queries based on one or more shared tokens; and
    generating a respective composite score for each of the subsequent queries based on a time period for the historical in-session user activity information, wherein generating the respective composite score for each of the subsequent queries based on the time period for the historical in-session user activity information comprises calculating the respective composite score by weighting different types of user interactions and normalizing the respective composite score based on a recency of user activity;
  generating suggested queries based on the customer journey graph, wherein generating the suggested queries based on the customer journey graph further comprises ranking the subsequent queries linked to the original queries based on the respective composite score for each of the subsequent queries to generate ranked subsequent queries, wherein generating the suggested queries further comprises modifying the ranked subsequent queries by:
    performing tokenization on the ranked subsequent queries; and
    generating the suggested queries based on the tokenization on the ranked subsequent queries; and
  in response to identifying an input query for a user session of a user:
    re-ranking the suggested queries;
    generating buttons that correspond to the suggested queries, as re-ranked, on a graphical user interface (GUI) of the user; and displaying the buttons, as generated, that correspond to the suggested queries, as re-ranked, to the user via the GUI.

2. The system of claim 1, wherein:
the historical in-session user activity information further comprises:
   interaction information corresponding to the original queries and the subsequent queries; and
the interaction information comprises:
   clicks;
   adds-to-cart (ATCs); and
   purchases.

3. The system of claim 2, wherein linking together the original queries and the subsequent queries further comprises linking together the original queries and the subsequent queries based on the interaction information.

4. The system of claim 1, wherein generating the respective composite score for each of the subsequent queries based on the time period for the historical in-session user activity information comprises using an equation comprising:

Composite Score=(1*clicks+2*atc+4*conversion)/(1+days_vintage), where days_vintage is the time period for the historical in-session user activity information.

5. The system of claim 1, wherein generating the suggested queries further comprises modifying the ranked subsequent queries by:
   performing spell correction on the ranked subsequent queries;
   performing stemming on the ranked subsequent queries; and
   normalizing the suggested queries, as ranked, based on identifying a brand or a price of the suggested queries, as ranked, to generate ranked normalized suggested queries.

6. The system of claim 5, wherein identifying the input query for the user session of the user further comprises:
   identifying an original query of the original queries in the customer journey graph that corresponds to the input query for the user session of the user; and
   identifying the suggested queries, as ranked and normalized, for the original query.

7. The system of claim 5, wherein re-ranking the suggested queries further comprises filtering the suggested queries, as ranked and normalized, based on the historical in-session user activity information for the user.

8. The system of claim 1, wherein re-ranking the suggested queries further comprises generating an adjusted score for the ranked subsequent queries using an equation comprising:

Adjusted Score=engagement*$W1$+Brand Affinity*$W2$+(Query Facet*$W3$/PT Facet*$W4$), wherein the engagement is a portion of the respective composite score, wherein the brand affinity is a product type score for the user, and wherein the query facet is a number of filters applied by the user.

9. The system of claim 1, wherein displaying the buttons, as generated, that correspond to the suggested queries, as re-ranked, to the user via the GUI further comprises displaying eight of the suggested queries having an adjusted score above a threshold.

10. A method implemented via execution of computing instructions configured to run at one or more processors and configured to be stored at non-transitory computer-readable media, the method comprising:
   receiving historical in-session user activity information, wherein the historical in-session user activity information comprises:
      original queries input by one or more users; and
      subsequent queries input by the one or more users;
   building a customer journey graph based on the historical in-session user activity information, comprising:
      linking together the original queries and the subsequent queries based on one or more shared tokens; and
      generating a respective composite score for each of the subsequent queries based on a time period for the historical in-session user activity information, wherein generating the respective composite score for each of the subsequent queries based on the time period for the historical in-session user activity information comprises calculating the respective composite score by weighting different types of user interactions and normalizing the respective composite score based on a recency of user activity;
   generating suggested queries based on the customer journey graph, wherein generating the suggested queries based on the customer journey graph further comprises ranking the subsequent queries linked to the original queries based on the respective composite score for each of the subsequent queries to generate ranked subsequent queries, wherein generating the suggested queries further comprises modifying the ranked subsequent queries by:
      performing tokenization on the ranked subsequent queries; and
      generating the suggested queries based on the tokenization on the ranked subsequent queries; and
   in response to identifying an input query for a user session of a user:
      re-ranking the suggested queries;
      generating buttons that correspond to the suggested queries, as re-ranked, on a graphical user interface (GUI) of the user; and
      displaying the buttons, as generated, that correspond to the suggested queries, as re-ranked, to the user via the GUI.

11. The method of claim 10, wherein:
the historical in-session user activity information further comprises:
   interaction information corresponding to the original queries and the subsequent queries; and
the interaction information comprises:
   clicks;
   adds-to-cart (ATCs); and
   purchases.

12. The method of claim 11, wherein linking together the original queries and the subsequent queries further comprises linking together the original queries and the subsequent queries based on the interaction information.

13. The method of claim 10, wherein generating the respective composite score for each of the subsequent queries based on the time period for the historical in-session user activity information comprises using an equation comprising:

Composite Score=(1*clicks+2*atc+4*conversion)/(1+days_vintage), where days_vintage is the time period for the historical in-session user activity information.

14. The method of claim 10, wherein generating the suggested queries further comprises modifying the ranked subsequent queries by:

performing spell correction on the ranked subsequent queries;

performing stemming on the ranked subsequent queries; and normalizing the suggested queries, as ranked, based on identifying a brand or a price of the suggested queries, as ranked, to generate ranked normalized suggested queries.

15. The method of claim 14, wherein identifying the input query for the user session of the user further comprises:
   identifying an original query of the original queries in the customer journey graph that corresponds to the input query for the user session of the user; and
   identifying the suggested queries, as ranked and normalized, for the original query.

16. The method of claim 14, wherein re-ranking the suggested queries further comprises filtering the suggested queries, as ranked and normalized, based on the historical in-session user activity information for the user.

17. The method of claim 10, wherein re-ranking the suggested queries further comprises generating an adjusted score for the ranked subsequent queries using an equation comprising:

$$\text{Adjusted Score} = \text{engagement} * W1 + \text{Brand Affinity} * W2 + (\text{Query Facet} * W3 / PT \text{ Facet} * W4),$$

wherein the engagement is a portion of the respective composite score, wherein the brand affinity is a product type score for the user, and wherein the query facet is a number of filters applied by the user.

18. The method of claim 10, wherein displaying the suggested queries, as re-ranked, to the user via the GUI further comprises displaying eight of the suggested queries having an adjusted score above a threshold.

19. A non-transitory computer-readable medium storing instructions, the instructions, upon execution by a processor, cause the processor to perform operations comprising a method for providing query suggestions based on a customer journey graph, the method comprising:
   receiving historical in-session user activity information, wherein the historical in-session user activity information comprises:
     original queries input by one or more users; and
     subsequent queries input by the one or more users;
   building the customer journey graph based on the historical in-session user activity information, comprising:
     linking together the original queries and the subsequent queries based on one or more shared tokens; and
     generating a respective composite score for subsequent queries based on a time period for the historical in-session user activity information, wherein generating the respective composite score for each of the subsequent queries based on the time period for the historical in-session user activity information comprises calculating the respective composite score by weighting different types of user interactions and normalizing the respective composite score based on a recency of user activity;
   generating suggested queries based on the customer journey graph, wherein generating the suggested queries based on the customer journey graph further comprises ranking the subsequent queries linked to the original queries based on the respective composite score for each of the subsequent queries to generate ranked subsequent queries, wherein generating the suggested queries further comprises modifying the ranked subsequent queries by:
     performing tokenization on the ranked subsequent queries; and
     generating the suggested queries based on the tokenization on the ranked subsequent queries; and
   in response to identifying an input query for a user session of a user:
     re-ranking the suggested queries, wherein re-ranking the suggested queries further comprises generating an adjusted score for the subsequent queries;
     generating buttons that correspond to the suggested queries, as re-ranked, on a graphical user interface (GUI) of the user; and
     displaying the buttons, as generated, that correspond to the suggested queries, as re-ranked, to the user via the GUI.

20. The non-transitory computer-readable medium storing the instructions of claim 19, wherein generating the adjusted score for the subsequent queries further comprises using an equation, the equation comprising:

$$\text{Adjusted Score} = \text{engagement} * W1 + \text{Brand Affinity} * W2 + (\text{Query Facet} * W3 / PT \text{ Facet} * W4),$$

wherein the engagement is a portion of the respective composite score, wherein the brand affinity is a product type score for the user, and wherein the query facet is a number of filters applied by the user.

* * * * *